United States Patent
Yang et al.

(10) Patent No.: US 11,177,706 B2
(45) Date of Patent: Nov. 16, 2021

(54) BUILT-IN HYBRID PERMANENT MAGNET MEMORY MOTOR WITH LOCAL MAGNETIC CIRCUITS IN PARALLEL

(71) Applicant: SOUTHEAST UNIVERSITY, Jiangsu (CN)

(72) Inventors: Hui Yang, Jiangsu (CN); Hao Zheng, Jiangsu (CN); Heyun Lin, Jiangsu (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 17/264,201

(22) PCT Filed: Mar. 22, 2019

(86) PCT No.: PCT/CN2019/079177
§ 371 (c)(1),
(2) Date: Jan. 28, 2021

(87) PCT Pub. No.: WO2020/034637
PCT Pub. Date: Feb. 20, 2020

(65) Prior Publication Data
US 2021/0249919 A1  Aug. 12, 2021

(30) Foreign Application Priority Data
Aug. 14, 2018 (CN) .......................... 201810919764.9

(51) Int. Cl.
*H02K 1/27* (2006.01)
*H02K 1/02* (2006.01)
(Continued)

(52) U.S. Cl.
CPC ............. *H02K 1/2766* (2013.01); *H02K 1/02* (2013.01); *H02K 1/14* (2013.01); *H02K 1/182* (2013.01); *H02K 2201/03* (2013.01)

(58) Field of Classification Search
CPC ........ H02K 1/2766; H02K 1/14; H02K 1/182; H02K 1/02; H02K 2201/03; H02K 1/272; H02K 1/2773
See application file for complete search history.

(56) References Cited

U.S. PATENT DOCUMENTS

2017/0155294 A1  6/2017 Chiu
2019/0181705 A1*  6/2019 Yokota ................. H02K 1/2766

FOREIGN PATENT DOCUMENTS

CN  103683771 A  3/2014
CN  106026585 A  10/2016
(Continued)

OTHER PUBLICATIONS

Machine Translation, Lin, CN-109088494-A, Dec. 2018. (Year: 2018).*
International Search Report issued in corresponding International application No. PCT/CN2019/079177 with a completion date of May 24, 2019 (with English translation) 5 pages.
(Continued)

*Primary Examiner* — Thomas Truong
(74) *Attorney, Agent, or Firm* — Muncy, Geissler, Olds and Lowe, P.C.

(57) ABSTRACT

The present invention discloses a built-in hybrid permanent magnet memory motor with local magnetic circuits in parallel, including a hybrid permanent magnet rotor, a stator, armature windings and a rotating shaft. The armature windings are disposed on the stator, and the stator is disposed outside the hybrid permanent magnet rotor. The hybrid permanent magnet rotor includes a rotor core, first permanent magnets, second permanent magnets and V-shaped magnetic barriers. The rotor core is disposed outside the rotating shaft, the V-shaped magnetic barriers are disposed inside the rotor core, the V-shaped magnetic barriers with openings facing outwards are equally distributed in a circumferential direction of the rotor core, the first permanent magnet is disposed in the opening of the V-shaped magnetic barrier, the second permanent magnet is disposed between
(Continued)

the two adjacent V-shaped magnetic barriers, a coercivity of the first permanent magnet is greater than a coercivity of the second permanent magnet, and cross sections of the first permanent magnets and the second permanent magnets are in a straight line. According to the present invention, the problem that the size design of the permanent magnet is limited by the space position is solved, and the anti-demagnetization ability of the low-coercivity permanent magnets and the flux weakening ability of the motor are enhanced.

9 Claims, 4 Drawing Sheets

(51) Int. Cl.
 *H02K 1/14* (2006.01)
 *H02K 1/18* (2006.01)

(56) References Cited

FOREIGN PATENT DOCUMENTS

| CN | 107516953 A | | 12/2017 |
| CN | 108023421 A | | 5/2018 |
| CN | 108110980 A | | 6/2018 |
| CN | 109088494 A | * | 12/2018 |
| CN | 109088494 A | | 12/2018 |
| JP | 2000333390 A | | 11/2000 |

OTHER PUBLICATIONS

Notification to Grant Patent Right for Invention issued in corresponding CN application No. 201810919764.9 dated Mar. 18, 2020 (with English translation) 3 pages.

First Office Action issued in corresponding CN application No. 201810919764.9 dated Aug. 14, 2019 (with English translation) 17 pages.

* cited by examiner

BUILT-IN HYBRID PERMANENT MAGNET MEMORY MOTOR WITH LOCAL MAGNETIC CIRCUITS IN PARALLEL

BACKGROUND

Technical Field

The present invention relates to a permanent magnet memory motor, and in particular relates to a built-in hybrid permanent magnet memory motor with local magnetic circuits in parallel, belonging to the technical field of motors.

Related Art

In the field of motors, due to the inherent characteristics of ordinary permanent magnet materials (such as neodymium-iron-boron), the air-gap magnetic field in an ordinary permanent magnet synchronous motor (PMSM) basically remains constant, so the ordinary permanent magnet synchronous motor has a very limited range of speed control when used for electric operation, and is subject to certain restrictions when applied to wide-range-speed-control direct-drive occasions such as electric vehicles, aerospace and the like. Therefore, a magnetic-flux-adjustable permanent magnet motor, which aims at realizing the effective control of the air-gap magnetic field of the permanent magnet motor, has always been a hotspot and a difficulty in the field of motor research. A permanent magnet memory motor (hereinafter referred to as "memory motor") is a novel magnetic-flux-controllable permanent magnet motor. The memory motor uses low-coercivity aluminum-nickel-cobalt permanent magnets to generate circumferential magnetic fields through stator windings or DC pulse windings, so that the magnetization of the permanent magnets is changed, the air-gap magnetic field is adjusted, and the permanent magnets have the characteristic that the flux density level can be memorized.

The traditional memory motor is developed from a write-pole motor, and its rotor is of a sandwich structure composed of an aluminum-nickel-cobalt permanent magnet, a non-magnetic interlayer and a rotor core. This special structure can realize on-line repeated irreversible magnetization and demagnetization of the permanent magnet at any time, and reduce the influence of the quadrature axis armature reaction on the air-gap magnetic field.

However, the rotor of the memory motor in this basic structure has defects. Since the permanent magnet is located at the rotor, the armature winding has the functions of both energy conversion and magnetic field adjustment, thereby greatly increasing the difficulty of on-line flux adjustment. Due to the adoption of the aluminum-nickel-cobalt permanent magnet, in order to acquire sufficient magnetic flux, the permanent magnet material needs to reach a sufficient thickness, but it is not easy to realize in the case of the above-tangential structure. The whole rotor is composed of multiple parts which are fastened together to the shaft, so the mechanical reliability is reduced to some extent. In the application occasions requiring wide-range-speed-control drive motors (such as machine tools and electric vehicles), the use of the above structure will lead to low main flux of the permanent magnet air gap, and the mechanical properties of the motor need to be improved.

Therefore, many scholars have successively proposed multiple hybrid permanent magnet built-in permanent magnet memory motors in a topological structure. The inside of the rotor is provided with permanent magnets of two different materials for co-excitation, in which the neodymium-iron-boron permanent magnet provides the air-gap main magnetic field and the aluminum-nickel-cobalt permanent magnet performs the function of magnetic field adjustment. However, due to the saturation of the rotor permanent magnet and the core magnetic circuit, the cross demagnetization of the low-coercivity permanent magnets will be severe in the high-load operation area, so that the reluctance torque is severely reduced, and the torque density of the motor is affected.

For a traditional U-shaped parallel magnetic circuit built-in permanent magnet memory motor, the requirement for the coercivity of the aluminum-nickel-cobalt permanent magnet is generally high, otherwise the aluminum-nickel-cobalt permanent magnet will be easily reversely demagnetized largely by the neodymium-iron-boron permanent magnet under no-load conditions. Under load conditions, the aluminum-nickel-cobalt permanent magnet is susceptible to the reverse demagnetization of the armature reaction magnetic field and the neodymium-iron-boron permanent magnet, so the operating point of the permanent magnets will be reduced accordingly, resulting in a decrease in torque density.

SUMMARY

In view of the above defects in the prior art, the present invention provides a built-in hybrid permanent magnet memory motor with local magnetic circuits in parallel, which solves the problem of limited size of permanent magnets, low utilization ratio, severe cross-coupling demagnetization of high-coercivity permanent magnets on low-coercivity permanent magnets, and unstable operating point of the low-coercivity permanent magnets in the existing built-in permanent magnet motor with magnetic circuits in parallel.

The technical solution of the present invention is as follows: a built-in hybrid permanent magnet memory motor with local magnetic circuits in parallel includes a hybrid permanent magnet rotor, a stator, armature windings and a rotating shaft. The armature windings are disposed on the stator, and the stator is disposed outside the hybrid permanent magnet rotor. The hybrid permanent magnet rotor includes a rotor core, first permanent magnets, second permanent magnets and V-shaped magnetic barriers. The rotor core is disposed outside the rotating shaft, the V-shaped magnetic barriers are disposed inside the rotor core, the V-shaped magnetic barriers with openings facing outwards are equally distributed in a circumferential direction of the rotor core, the first permanent magnet is disposed in the opening of the V-shaped magnetic barrier, the second permanent magnet is disposed between the two adjacent V-shaped magnetic barriers, a coercivity of the first permanent magnet is greater than a coercivity of the second permanent magnet, and cross sections of the first permanent magnets and the second permanent magnets are in a straight line.

Further, a thickness of a bottom of the V-shaped magnetic barrier is greater than a thickness of a side surface.

Further, the rotor core is provided with a plurality of air slots with a straight-line cross section, and the first permanent magnets and the second permanent magnets are respectively disposed in the air slots.

Further, a gap is provided between the first permanent magnet and the air slot, and the gap is located on a side of the first permanent magnet away from the rotating shaft.

Further, the first permanent magnet is disposed with a length direction of its cross section in a radial direction of the circumference of the rotor core, and the second permanent magnet is disposed with a length direction of its cross section in a tangential direction of the circumference of the rotor core.

Further, a symmetry axis of a cross section of the V-shaped magnetic barrier coincides with a length-direction symmetry axis of the cross section of the first permanent magnet, and the side surface of the V-shaped magnetic barrier is perpendicular to a length-direction symmetry axis of the cross section of the second permanent magnet.

Further, the first permanent magnet is magnetized in a tangential direction of the circumference of the rotor core, and the second permanent magnet is magnetized in a radial direction of the circumference of the rotor core.

Further, magnetizing directions of the adjacent first permanent magnets are opposite, and magnetizing directions of the adjacent second permanent magnets are opposite.

Further, the numbers of the first permanent magnets, the second permanent magnets and the V-shaped magnetic barriers are the same and are an even number.

Further, the first permanent magnet is a neodymium-iron-boron permanent magnet, and the second permanent magnet is an aluminum-nickel-cobalt permanent magnet.

The technical solution provided by the present invention has the following advantages:

1. According to the present invention, the first permanent magnets with larger coercivity and the first permanent magnets with smaller coercivity are interwoven in space position, so that the problem that the size design of the permanent magnet is limited by the space position is solved, the effective area of magnetic flux is increased, and the design freedom and the utilization ratio of permanent magnets are enhanced.

2. According to the present invention, the arrangement of the tangentially magnetized first permanent magnets placed in the radial direction and the radially magnetized second permanent magnets placed tangentially in the circumferential direction will form a flux gathering effect, and the two types of permanent magnets are in a local parallel relationship in the magnetic circuits to jointly affect the permanent magnet flux linkage of the air gap, thereby realizing flexible adjustment of the air-gap flux density.

3. According to the present invention, by placing the second permanent magnet in a suitable position close to the air gap, the required magnetizing current can be effectively reduced.

4. According to the present invention, by using the V-shaped magnetic barriers, the quadrature axis inductance can be reduced, the cross-coupling demagnetization effect of the first permanent magnets on the second permanent magnets can be weakened, and the stability of the operating point of the second permanent magnet can be improved.

DETAILED DESCRIPTION

The present invention will be further described below in conjunction with embodiments. It should be understood that these embodiments are only used to illustrate the present invention and not to limit the scope of the present invention. After reading the present invention, various equivalent modifications made by those skilled in the art to the present invention shall fall within the scope defined by the appended claims of the present application.

Figure 1:
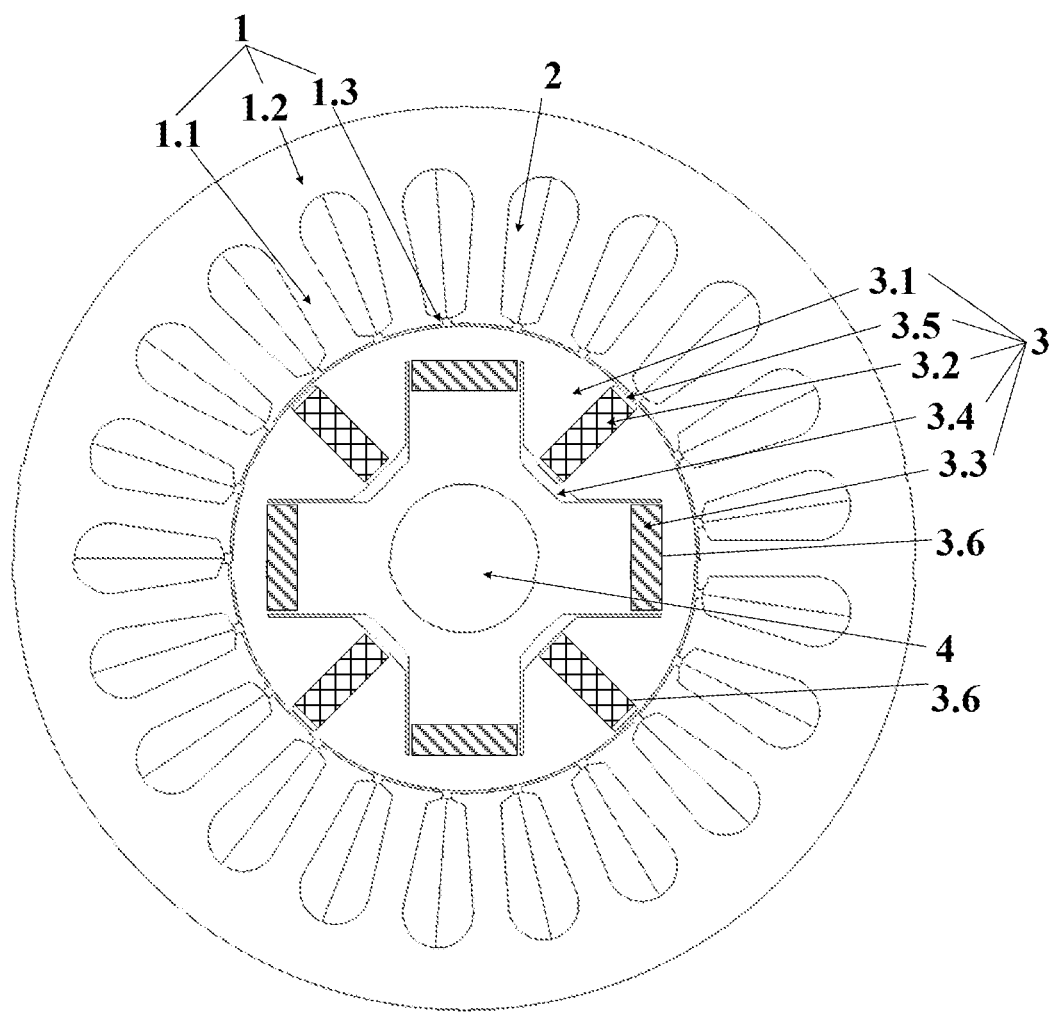
FIG. 1 is a cross-sectional structure diagram of a motor according to the present invention.
Figure 2:
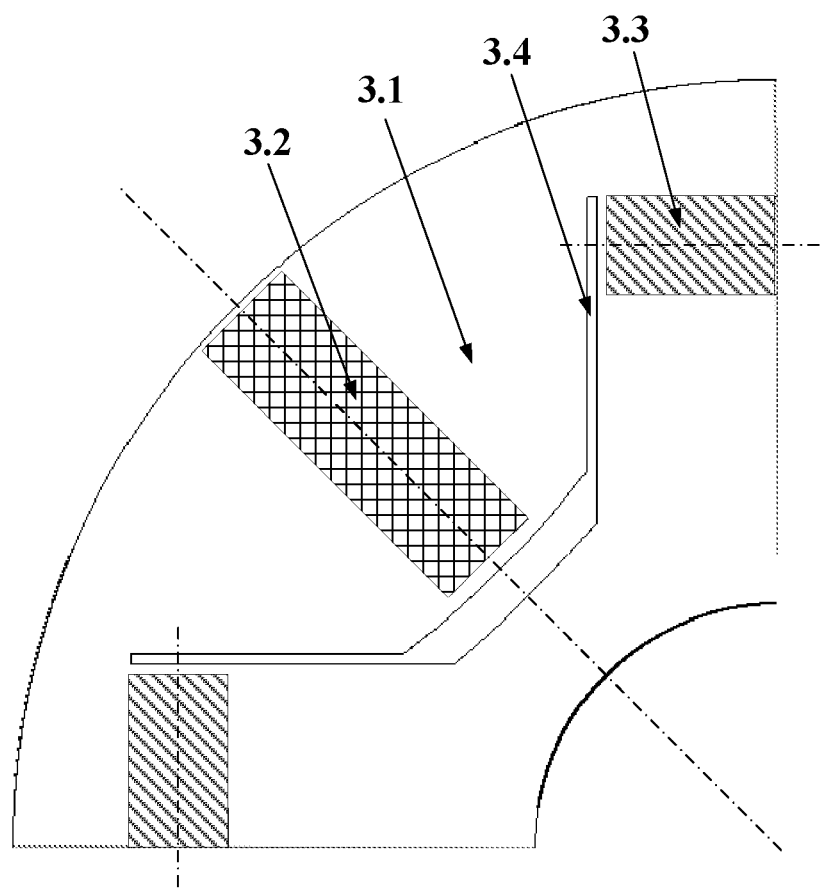
FIG. 2 is a schematic diagram of relative space positions of a first permanent magnet, a second permanent magnet and a V-shaped magnetic barrier of the motor according to the present invention.

Referring to FIG. 1 and FIG. 2 together, a built-in hybrid permanent magnet memory motor with local magnetic circuits in parallel involved in this embodiment includes a stator 1, armature windings 2, a hybrid permanent magnet rotor 3 and a non-magnetizer rotating shaft 4. The stator is disposed outside the hybrid permanent magnet rotor. The stator includes stator core teeth 1.1, a stator yoke 1.2 and the armature windings 2 disposed on the stator core teeth. The stator core teeth 1.1 are disposed between the stator yoke 1.2 and the hybrid permanent magnet rotor 3. A cavity 1.3 is formed between the adjacent stator core teeth 1.1 and used for accommodating the three-phase armature winding 2 wound on the stator core teeth 1.1.

The hybrid permanent magnet rotor 3 includes a rotor core 3.1, first permanent magnets 3.2, second permanent magnets 3.3 and V-shaped magnetic barriers 3.4. The rotor core 3.1 is disposed outside the non-magnetizer rotating shaft. The V-shaped magnetic barriers 3.4 are disposed inside the rotor core 3.1. The V-shaped magnetic barriers 3.4 with openings facing outwards are equally distributed in a circumferential direction of the rotor core 3.1. A thickness of a bottom of the V-shaped magnetic barrier 3.4 is greater than a thickness of a side surface. The thicker bottom is used to effectively prevent the flux leakage path of neodymium-iron-boron, and the two narrower sides are used to guide the permanent magnet flux, so that part of the permanent magnet flux at the bottom of the neodymium-iron-boron can pass through the magnetic barrier and flow to the air gap through the aluminum-nickel-cobalt permanent magnet, thereby stabilizing the operating point of the aluminum-nickel-cobalt permanent magnet. The rotor core 3.1 is provided with air slots 3.6 with a straight-line cross section, the number of which is twice the number of the V-shaped magnetic barriers 3.4. The first permanent magnets 3.2 and the second permanent magnets 3.3 also with a straight-line cross section are respectively disposed in the air slots 3.6. A gap 3.5 is provided between the first permanent magnet 3.2 and the air slot 3.6, and the gap 3.5 is located on a side of the first permanent magnet 3.2 away from the rotating shaft, which can reduce the leakage flux on the two ends of the first permanent magnet 3.2. The numbers of the first permanent magnets 3.2 and the second permanent magnets 3.3 are the same as the number of the V-shaped magnetic barriers 3.4. In this embodiment, the numbers of the V-shaped magnetic barriers 3.4, the first permanent magnets 3.2 and the second permanent magnets 3.3 are each four, and the number of the air slots 3.6 is eight. The first permanent magnet 3.2 is a neodymium-iron-boron permanent magnet, which is disposed in the opening of the V-shaped magnetic barrier 3.4. A symmetry axis of the cross section of the V-shaped magnetic barrier 3.4 coincides with a length-direction symmetry axis of the cross section of the first permanent magnet 3.2. The first permanent magnet 3.2 is disposed with a length direction of its cross section in a radial direction of the circumference of the rotor core 3.1, the first permanent magnet 3.2 is magnetized in a tangential direction of the circumference of the rotor core 3.1, and magnetizing directions of the adjacent first permanent magnets 3.2 are opposite. The second permanent magnet 3.3 is an aluminum-nickel-cobalt permanent magnet, which is disposed between the two adjacent V-shaped magnetic barriers 3.4. The side surface of the V-shaped magnetic barrier 3.4 is perpendicular to a length-direction symmetry axis of the cross section of the second permanent magnet 3.3. The second permanent magnet 3.3 is disposed with a length direction of its cross section in a tangential direction of the circumference of the rotor core 3.1, the second permanent magnet 3.3 is magnetized in a radial direction of the circumference of the rotor core 3.1, and magnetizing directions of the adjacent second permanent magnets 3.3 are opposite.

Figure 3:
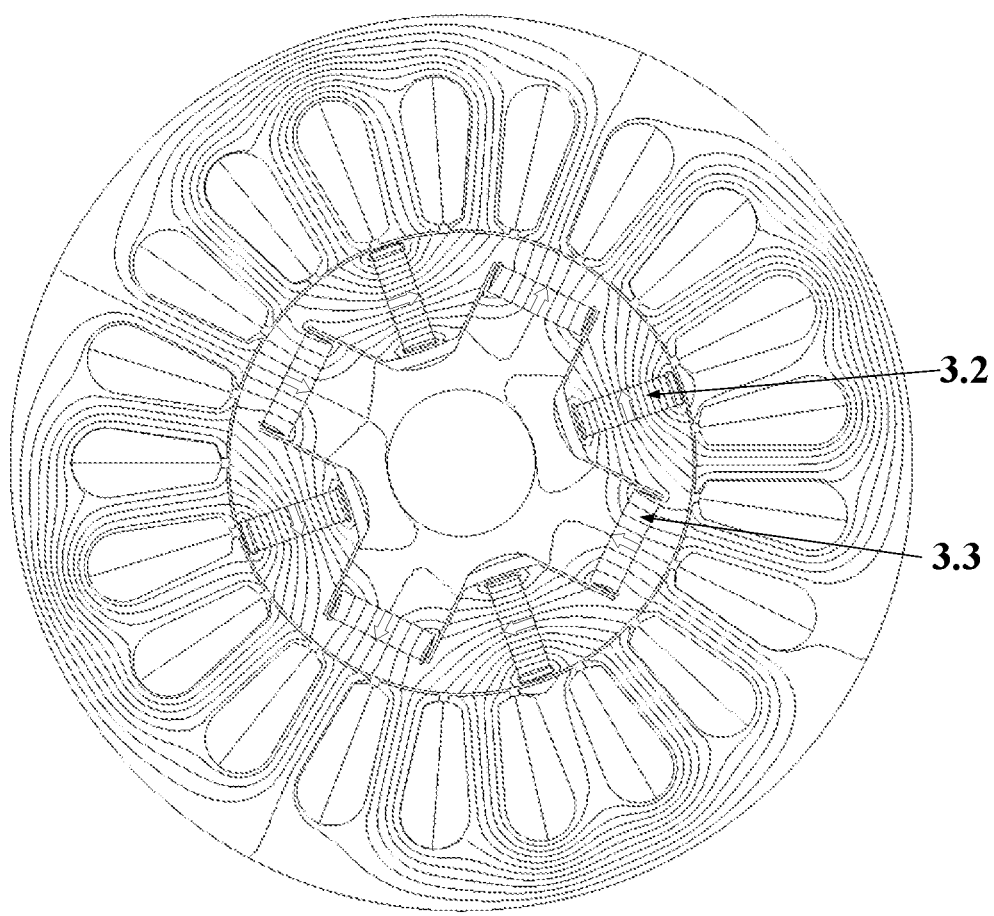
FIG. 3 is a distribution diagram of magnetic induction lines when the second permanent magnets of the motor are in a flux increasing state according to the present invention.
Figure 4:
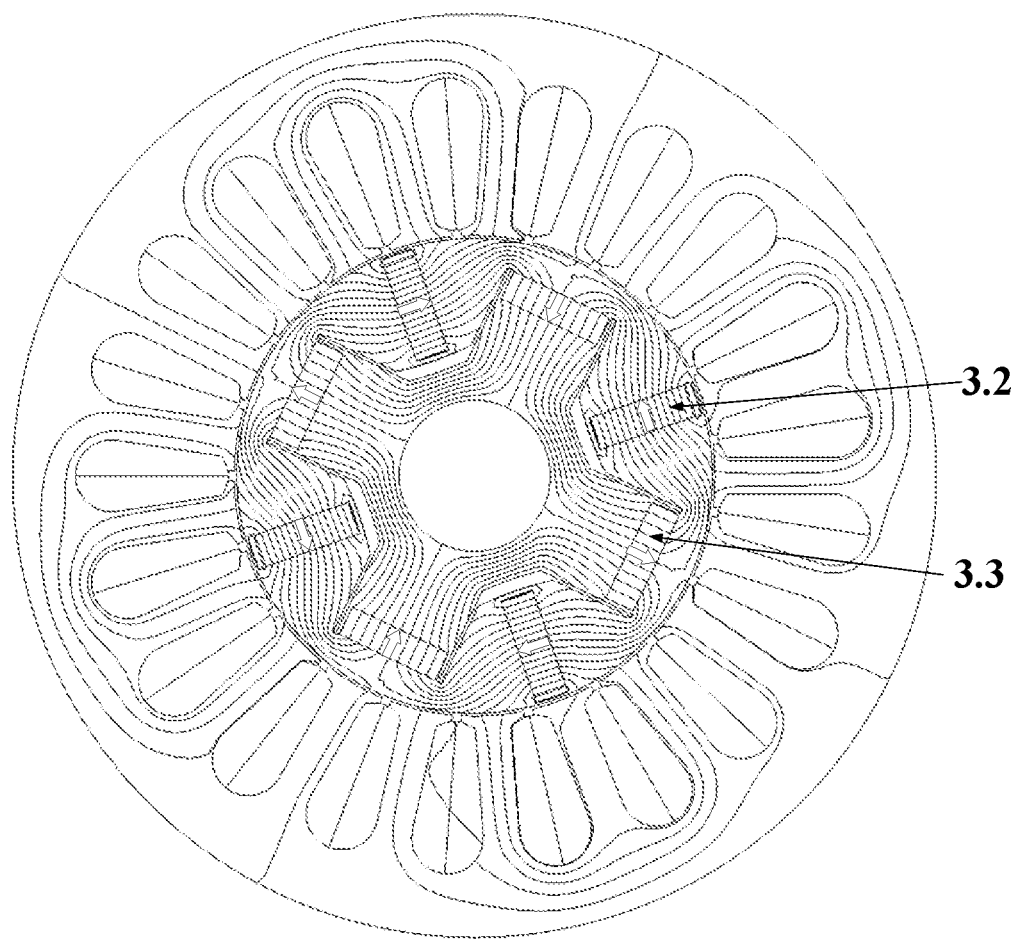
FIG. 4 is a distribution diagram of magnetic induction lines when the second permanent magnets of the motor are in a flux weakening state according to the present invention.

The operating principle of the built-in hybrid permanent magnet memory motor with local magnetic circuits in parallel disclosed in the present invention is as follows:

The permanent magnet flux first starts from north poles of the neodymium-iron-boron permanent magnets disposed in the radial direction of the circumference of the rotor core. Part of the permanent magnet flux passes through the rotor core, reaches the stator core teeth through the air gaps, passes through the stator yoke, and returns to south poles of the neodymium-iron-boron permanent magnets in the same path, and part of the permanent magnet flux reaches the south poles of the aluminum-nickel-cobalt permanent magnets through the V-shaped magnetic barriers. Considering the magnetization direction of the aluminum-nickel-cobalt permanent magnet at this time, if the aluminum-nickel-cobalt permanent magnet is magnetized in the radial direction outwards along the circumferential direction, the aluminum-nickel-cobalt permanent magnet is in a flux increasing state at this time, and the two types of permanent magnet flux are superimposed and flow in the same direction. If the aluminum-nickel-cobalt permanent magnet is magnetized in the radial direction inwards along the circumferential direction, the aluminum-nickel-cobalt permanent magnet is in a flux weakening state at this time, and the two types of permanent magnet flux will be offset due to different directions. The offset permanent magnet flux will continue to flow, reach the stator core teeth through the air gaps, pass through the stator yoke, and respectively return to the south poles of the neodymium-iron-boron permanent magnets and the aluminum-nickel-cobalt permanent magnet in the same path. The distribution of magnetic induction lines of the aluminum-nickel-cobalt permanent magnets in two magnetized states is shown in FIG. 3 and FIG. 4. In the meanwhile, the armature windings of the motor are supplied with a three-phase alternating current with the same speed as the hybrid permanent magnet rotor, and the rotating magnetic fields formed by the stator and the rotor interact, thereby realizing electromechanical energy conversion. The added magnetic barrier structure can effectively reduce the quadrature axis inductance, weaken the cross-coupling demagnetization effect of the neodymium-iron-boron permanent magnets on the aluminum-nickel-cobalt permanent magnets, and improve the stability of the operating point of the aluminum-nickel-cobalt permanent magnets.

What is claimed is:

1. A built-in hybrid permanent magnet memory motor with local magnetic circuits in parallel, comprising a hybrid permanent magnet rotor, a stator, armature windings and a rotating shaft, the armature windings being disposed on the stator, and the stator being disposed outside the hybrid permanent magnet rotor, wherein the hybrid permanent magnet rotor comprises a rotor core, first permanent magnets, second permanent magnets and V-shaped magnetic barriers, the rotor core is disposed outside the rotating shaft, the V-shaped magnetic barriers are disposed inside the rotor core, the V-shaped magnetic barriers with openings facing outwards are equally distributed in a circumferential direction of the rotor core, wherein a thickness of a bottom of the V-shaped magnetic barrier is greater than a thickness of a side surface, the first permanent magnet is disposed in the opening of the V-shaped magnetic barrier, the second permanent magnet is disposed between the two adjacent V-shaped magnetic barriers, a coercivity of the first permanent magnet is greater than a coercivity of the second permanent magnet, and cross sections of the first permanent magnets and the second permanent magnets are in a straight line.

2. The built-in hybrid permanent magnet memory motor with local magnetic circuits in parallel according to claim 1, wherein the rotor core is provided with a plurality of air slots with a straight-line cross section, and the first permanent magnets and the second permanent magnets are respectively disposed in the air slots.

3. The built-in hybrid permanent magnet memory motor with local magnetic circuits in parallel according to claim 2, wherein a gap is provided between the first permanent magnet and the air slot, and the gap is located on a side of the first permanent magnet away from the rotating shaft.

4. The built-in hybrid permanent magnet memory motor with local magnetic circuits in parallel according to claim 1, wherein the first permanent magnet is disposed with a length direction of its cross section in a radial direction of the circumference of the rotor core, and the second permanent magnet is disposed with a length direction of its cross section in a tangential direction of the circumference of the rotor core.

5. The built-in hybrid permanent magnet memory motor with local magnetic circuits in parallel according to claim 1, wherein a symmetry axis of a cross section of the V-shaped magnetic barrier coincides with a length-direction symmetry axis of the cross section of the first permanent magnet, and the side surface of the V-shaped magnetic barrier is perpendicular to a length-direction symmetry axis of the cross section of the second permanent magnet.

6. The built-in hybrid permanent magnet memory motor with local magnetic circuits in parallel according to claim 1, wherein the first permanent magnet is magnetized in a tangential direction of the circumference of the rotor core, and the second permanent magnet is magnetized in a radial direction of the circumference of the rotor core.

7. The built-in hybrid permanent magnet memory motor with local magnetic circuits in parallel according to claim 1, wherein magnetizing directions of the adjacent first permanent magnets are opposite, and magnetizing directions of the adjacent second permanent magnets are opposite.

8. The built-in hybrid permanent magnet memory motor with local magnetic circuits in parallel according to claim 1, wherein the numbers of the first permanent magnets, the second permanent magnets and the V-shaped magnetic barriers are the same and are an even number.

9. The built-in hybrid permanent magnet memory motor with local magnetic circuits in parallel according to claim 1, wherein the first permanent magnet is a neodymium-iron-boron permanent magnet, and the second permanent magnet is an aluminum-nickel-cobalt permanent magnet.

* * * * *